(12) United States Patent
Clark et al.

(10) Patent No.: US 7,373,774 B2
(45) Date of Patent: May 20, 2008

(54) ENHANCED PERFORMANCE TORROIDAL COOLANT-COLLECTION MANIFOLD

(75) Inventors: Jim A. Clark, Jupiter, FL (US); Mark Ricciardo, Royal Palm Beach, FL (US)

(73) Assignee: United Technologies Corporation, Hartford, CT (US)

(*) Notice: Subject to any disclaimer, the term of this patent is extended or adjusted under 35 U.S.C. 154(b) by 874 days.

(21) Appl. No.: 10/777,435

(22) Filed: Feb. 12, 2004

(65) Prior Publication Data

US 2005/0178106 A1  Aug. 18, 2005

(51) Int. Cl.
*F02K 11/00* (2006.01)
*F02C 1/04* (2006.01)
(52) U.S. Cl. .......................... 60/267; 60/752
(58) Field of Classification Search .......... 60/752, 60/266, 267
See application file for complete search history.

(56) References Cited

U.S. PATENT DOCUMENTS 3,001,726 A * 9/1961 Hasbrouck .................. 239/468
3,062,566 A * 11/1962 Coburn ....................... 60/266
6,829,884 B2 * 12/2004 Fint et al. ................... 60/267
2004/0011023 A1   1/2004 Wherley et al.

FOREIGN PATENT DOCUMENTS

| EP | 0 697 515 A2 | 2/1996 |
| GB | 2 196 392 A | 4/1988 |
| JP | 6-330816 | 1/1994 |

* cited by examiner

*Primary Examiner*—Charles G Freay
(74) *Attorney, Agent, or Firm*—Bachman & LaPointe

(57) ABSTRACT

A system for cooling a combustion chamber of an engine, such as a rocket engine, is provided. The system has a plurality of coolant tubes or passages surrounding the combustion chamber, a torroidal coolant-collection manifold for receiving coolant from the coolant tubes or passages and for discharging the coolant through a discharge port, and a plurality of turning vanes within the torroidal manifold for reducing pressure loss and improving pressure uniformity associated with the torroidal coolant-collection manifold.

6 Claims, 3 Drawing Sheets

ENHANCED PERFORMANCE TORROIDAL COOLANT-COLLECTION MANIFOLD

BACKGROUND OF THE INVENTION

The present invention relates to a system for cooling a combustion chamber of an engine, such as a rocket engine, and more particularly, to a torroidal coolant-collection manifold having enhanced performance for use in said engine.

In a typical rocket engine, as shown in FIG. 1, coolant flows through a plurality of tubes or passages 10 that form the cylindrical wall 14 of a rocket combustion chamber 16. The coolant is discharged at relatively high velocity into a torroidal coolant-collection manifold 18, which typically has a single discharge port (not shown). Flow through individual tubes or passages 10 is influenced by pressures in the coolant-collection manifold 18. Since uniform flow through all of the tubes or passages 10 is desirable, pressures in the coolant-collection manifold 18 should be as uniform as possible.

Typical rocket engine applications require that overall coolant pressure loss be minimized so that engine performance can be optimized. The higher the coolant pressure loss, the higher the pumping pressure required to push the coolant through the engine. To help minimize overall coolant pressure loss, the pressure losses associated with the coolant-collection manifold 18 should be minimized.

In the current system as shown in FIG. 1, coolant from the individual tubes or passages 10 discharges radially or axially into the coolant-collection manifold 18. Once the coolant enters the manifold 18, it must turn ninety degrees and flow circumferentially toward the manifold's discharge port. This abrupt and uncontrolled turn is the source of significant pressure loss in the manifold 18. Furthermore, to push the coolant toward the manifold's discharge port, the torroidal manifold 18 develops a pressure gradient, with the highest pressure located 180 degrees from the discharge port. This pressure gradient contributes to non-uniform flow in the coolant tubes or passages.

SUMMARY OF THE INVENTION

Accordingly, it is an object of the present invention to provide an improved manifold structure for use in cooling combustion chambers in an engine which reduces the pressure loss in the manifold.

It is a further object of the present invention to provide an improved manifold structure as above which improves the pressure uniformity in the coolant tubes or passages and the manifold.

The foregoing objects are achieved by the enhanced performance torroidal coolant-collection manifold of the present invention.

In accordance with the present invention, a system for cooling a combustion chamber of an engine broadly comprises a plurality of coolant tubes or passages surrounding said combustion chamber, a torroidal coolant-collection manifold for receiving coolant from said coolant tubes or passages and for discharging said coolant through a discharge port, and means within the torroidal manifold for reducing pressure loss and improving pressure uniformity associated with said torroidal coolant-collection manifold. In a preferred embodiment of the present invention, the pressure reducing and pressure uniformity improving means comprises a plurality of turning vanes extending within said torroidal coolant-collection manifold.

Other details of the enhanced performance torroidal coolant-collection manifold of the present invention, as well as other objects and advantages attendant thereto, are set forth in the following detailed description and the accompanying drawings wherein like reference numerals depict like elements.

DETAILED DESCRIPTION OF THE PREFERRED EMBODIMENT(s)

Figure 1:
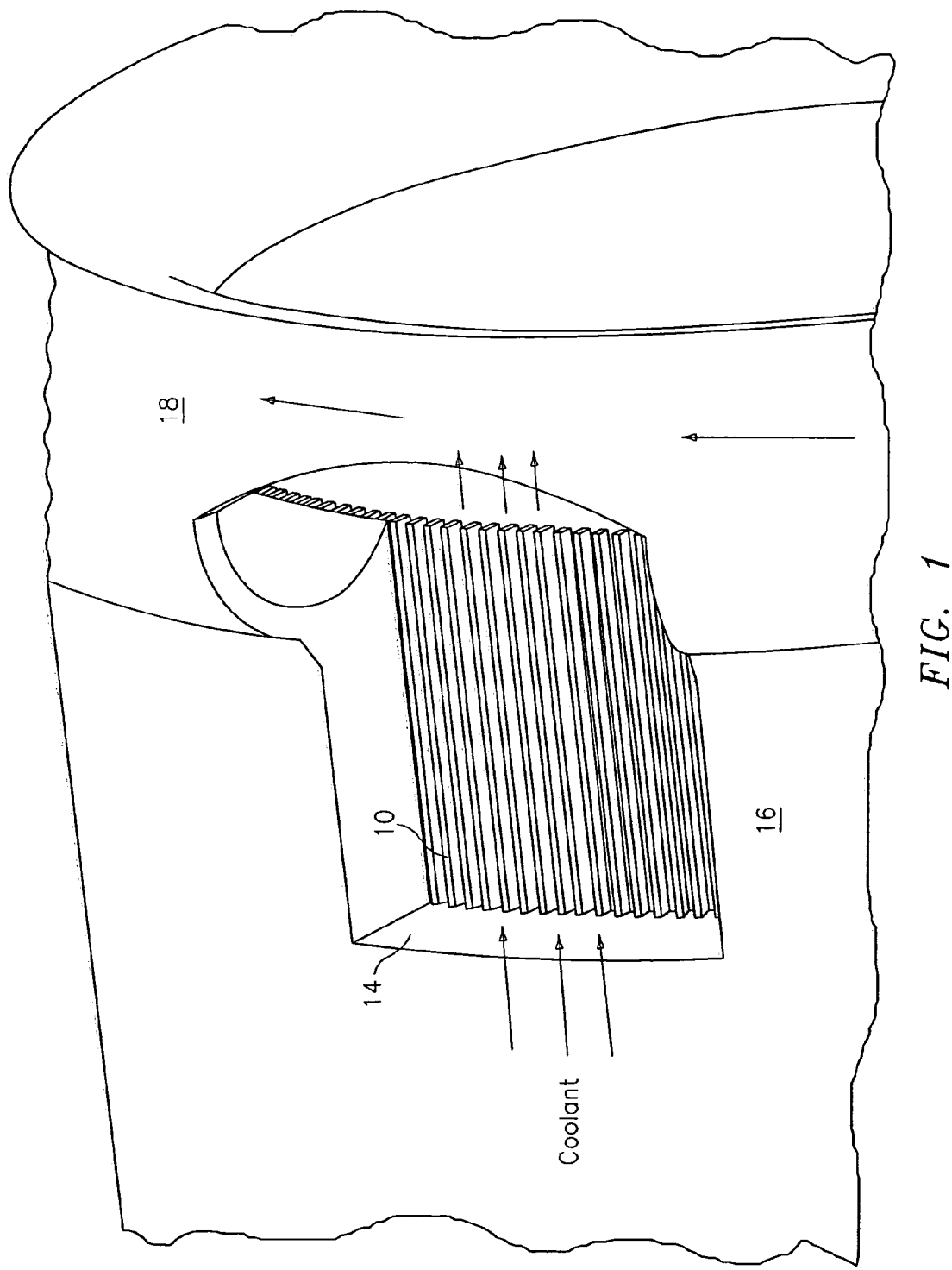
FIG. 1 illustrates a prior art coolant-collection manifold for a rocket engine combustion chamber.
Figure 2:
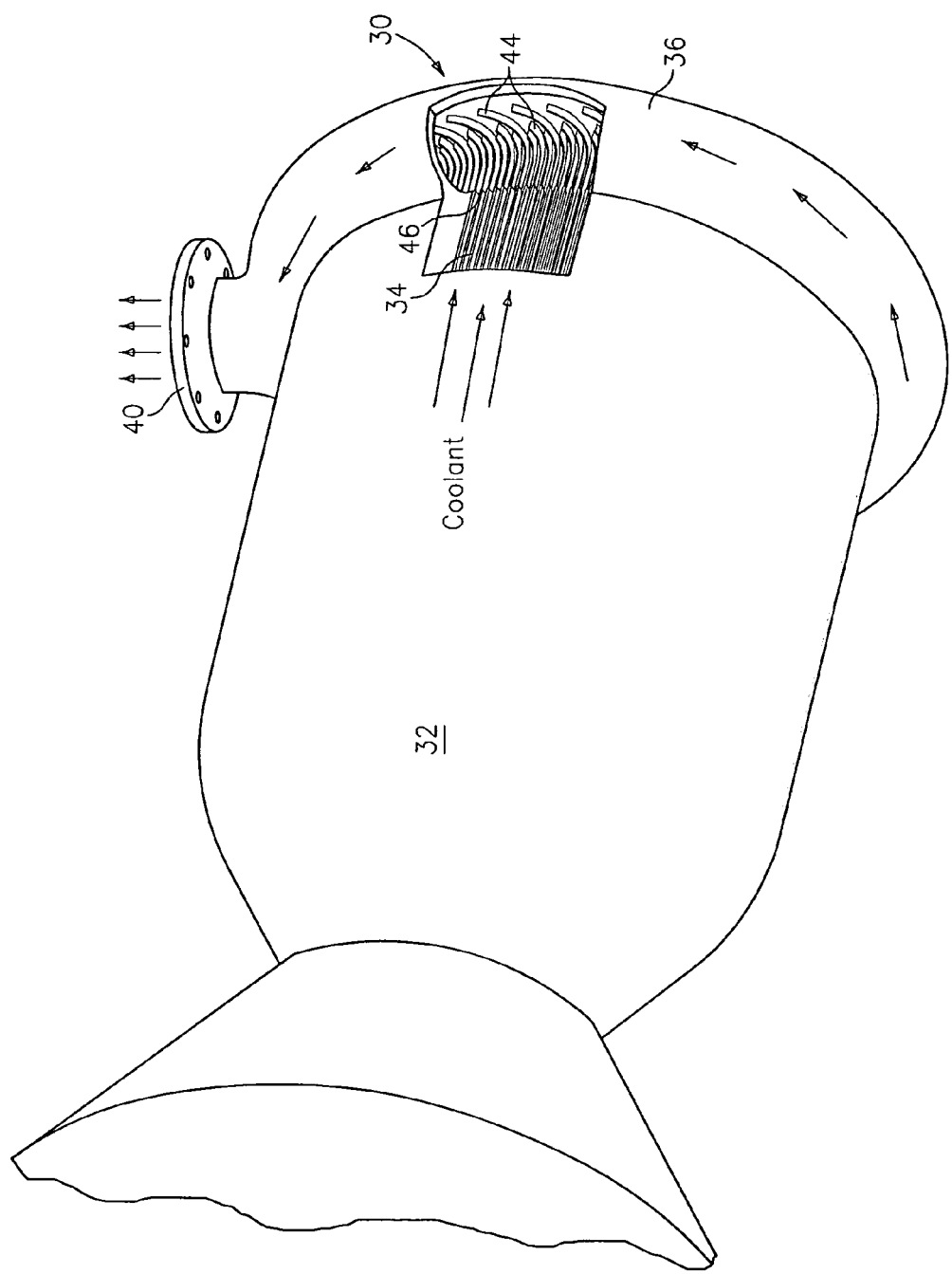
FIG. 2 illustrates a coolant-collection manifold for an engine combustion chamber in accordance with the present invention.
Figure 3:
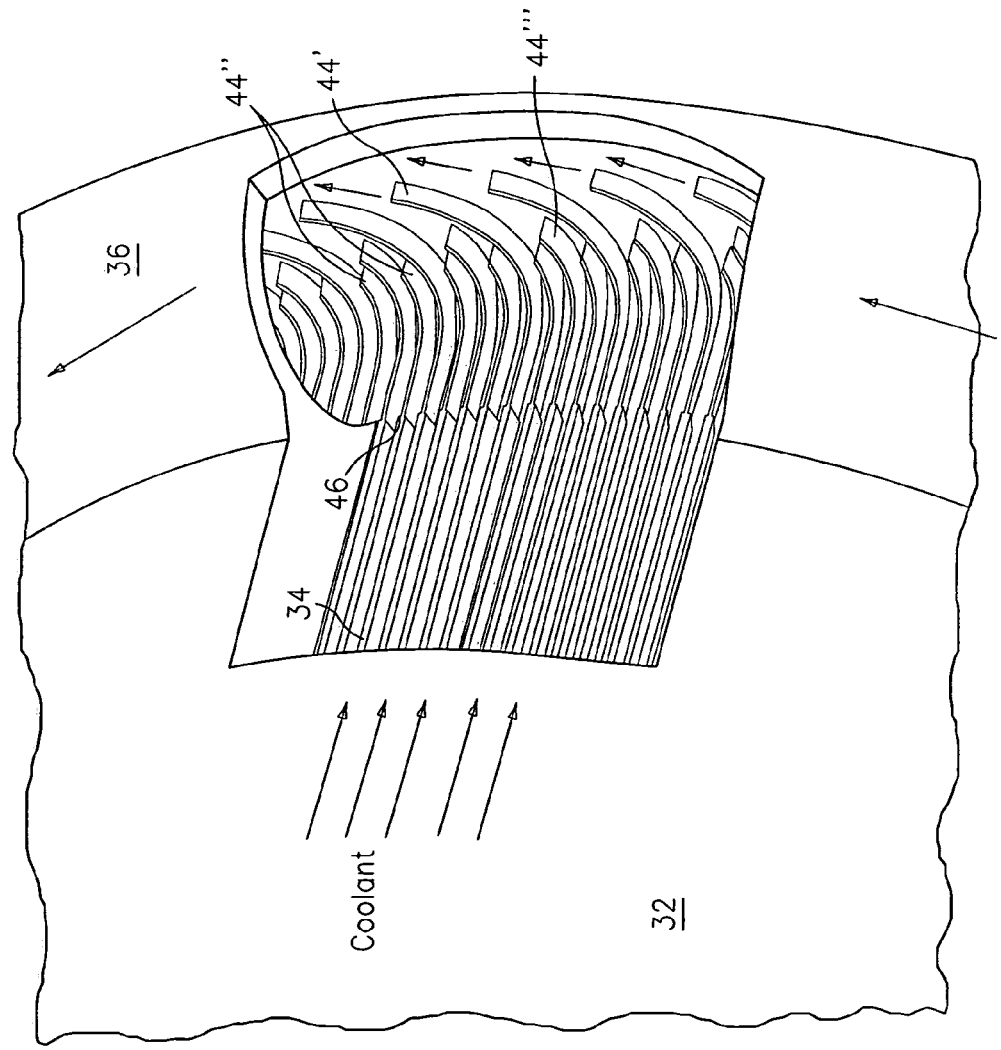
FIG. 3 illustrates an enlarged view of the coolant-collection manifold of FIG. 2.

Referring now to FIGS. 2 and 3, an improved system 30 for cooling a combustion chamber 32 of an engine, such as a rocket engine, is provided. The system 32 has a plurality of tubes or passages 34 which form the cylindrical wall of the combustion chamber 32. The coolant tubes or passages 34 are used to transport a cooling fluid from a source (not shown) of the fluid to a torroidal coolant-collection manifold 36.

The torroidal coolant-collection manifold 36 is located adjacent an end 38 of each coolant tube or passage 34. The torroidal coolant-collection manifold 36 has a discharge port 40. While ordinarily the manifold 36 has a single discharge port 40, it may have a plurality of such ports if desired.

As can be seen from FIGS. 2 and 3, a plurality of vanes 44 are provided within the manifold 36. Each vane 44 is aligned with a respective coolant tube or passage 34 and is located adjacent an opening 46 in said respective coolant tube or passage 34. Each vane 44 is used to turn the coolant flow exiting the respective coolant tube or passage 34 from a radial or axial direction to a tangential direction, i.e. toward the manifold discharge port(s) 40. The turning vanes 44 largely eliminate the sudden expansion and mixing losses that are seen in current manifolds.

As can be seen from FIGS. 2 and 3, the vanes 44 are incorporated into the inner wall of the manifold 36 or situated within the manifold such that the vanes 44 do not impede the bulk flow of coolant toward the manifold discharge port(s) 40.

The relatively high-velocity coolant exiting the turning vanes 44 acts as a jet pump for the bulk coolant flowing toward the discharge port 40. As a result, the turning vanes substantially, if not entirely, solve both the pressure loss and pressure-uniformity problems associated with the prior art torroidal coolant-collection manifolds.

As can be seen from FIGS. 2 and 3, the turning vanes 44 may have different arcuate extents or lengths. For example, the turning vanes 44 may be configured to have repeating pattern of four vanes where the vane 44' having the largest extent is located between two vanes 44" having a smallest extent, and a vane 44'" having an intermediate extent is positioned intermediate two of the vanes 44".

While the torroidal coolant-collection manifolds have been described in the context of rocket engine cooling systems, it should be recognized that the torroidal coolant-collection manifolds of the present invention could be used in other types of engines and devices that collect compressed gas.

It is apparent that there has been provided in accordance with the present invention an enhanced performance torroidal coolant-collection manifold which fully satisfies the objects, means, and advantages set forth hereinbefore. While the present invention has been described in the context of specific embodiments thereof, other alternatives, modifications, and variations will become apparent to those skilled in the art having read the foregoing description. Accordingly it is intended to embrace those alternatives, modifications, and variations as fall within the broad scope of the appended claims.

What is claimed is:

1. A system for cooling a combustion chamber of an engine comprising:
   a plurality of coolant tubes or passages surrounding said combustion chamber;
   a torroidal coolant-collection manifold for receiving coolant from said coolant tubes or passages and for discharging said coolant through a discharge port;
   means within the torroidal manifold for reducing pressure loss and improving pressure uniformity associated with said torroidal coolant-collection manifold;
   said pressure loss reducing and pressure uniformity improving means comprising a plurality of turning vanes positioned within said manifold; and
   at least some of said turning vanes having a longer extent than others of said turning vanes.

2. The system of claim 1, wherein said coolant tubes or passages form a wall of said combustion chamber.

3. The system of claim 1, wherein each said turning vane is positioned adjacent an end of an opening in one of said coolant tubes or passages so that a flow of coolant exiting said one coolant tube or passage is turned from a radial or axial direction to a tangential direction by said turning vanes.

4. The system of claim 1, wherein each of said turning vanes has an arcuately shaped portion.

5. The system of claim 1, wherein said manifold has a discharge port and said turning vanes are incorporated into an inner wall of said manifold or situated within said manifold so as not to impede bulk flow of said coolant toward said discharge port.

6. The system of claim 1, wherein said combustion chamber forms part of a rocket engine.

* * * * *